United States Patent
Ileogben (10) Patent No.: US 9,377,339 B2
(45) Date of Patent: Jun. 28, 2016

(54) FRAME SUPPORT FOR A HOOD VENT MEASUREMENT DEVICE

(71) Applicant: Pius O. Ileogben, Lawrenceville, GA (US)

(72) Inventor: Pius O. Ileogben, Lawrenceville, GA (US)

(*) Notice: Subject to any disclaimer, the term of this patent is extended or adjusted under 35 U.S.C. 154(b) by 942 days.

(21) Appl. No.: 13/623,094

(22) Filed: Sep. 19, 2012

(65) Prior Publication Data

US 2014/0076045 A1    Mar. 20, 2014

(51) Int. Cl.
*G01F 15/14* (2006.01)
*F24F 13/02* (2006.01)
*F24F 13/20* (2006.01)
*F24F 13/32* (2006.01)
*E06B 1/02* (2006.01)
*F24F 11/02* (2006.01)

(52) U.S. Cl.
CPC ............ *G01F 15/14* (2013.01); *F24F 13/0209* (2013.01); *F24F 13/0254* (2013.01); *F24F 13/20* (2013.01); *F24F 13/32* (2013.01); *E06B 1/02* (2013.01); *F24F 11/02* (2013.01)

(58) Field of Classification Search
CPC ...... G01F 15/14; F24F 13/0254; F24F 13/32; F24F 13/0209; F24F 13/20; F24F 11/02; E06B 1/02
See application file for complete search history.

(56) References Cited

U.S. PATENT DOCUMENTS

| | | | | |
|---|---|---|---|---|
| 2,863,180 A | * | 12/1958 | Birdwell | E04B 2/90 52/209 |
| 3,204,391 A | * | 9/1965 | Schwab | B01D 46/02 210/315 |
| 3,623,288 A | * | 11/1971 | Horowitz | E04B 1/6812 52/264 |
| 4,237,665 A | * | 12/1980 | Molyneux | E06B 1/003 49/504 |
| 4,488,391 A | * | 12/1984 | Pavnica | E06B 1/02 52/211 |
| 4,733,505 A | * | 3/1988 | Van Dame | E04D 13/03 52/200 |
| 4,807,667 A | * | 2/1989 | Ohnhaus | G01F 1/40 138/45 |
| 4,815,364 A | * | 3/1989 | Wagner | F24F 13/15 403/402 |
| 5,007,222 A | * | 4/1991 | Raymond | F24F 13/20 52/220.1 |
| 5,338,255 A | * | 8/1994 | Akehurst | F24F 13/06 248/27.1 |
| 5,338,256 A | * | 8/1994 | Tonna | F24F 13/06 454/300 |
| 5,450,879 A | * | 9/1995 | Toben | F24F 13/0209 138/109 |

(Continued)

*Primary Examiner* — Rodney Mintz
(74) *Attorney, Agent, or Firm* — Baxam Law Group, LLC; Deanna L. Baxam (57) ABSTRACT

A frame for supporting installation of an air measurement device over the opening of a duct or vent opening in the air circulation system of a building.

10 Claims, 10 Drawing Sheets

(56) References Cited

U.S. PATENT DOCUMENTS

| | | | | |
|---|---|---|---|---|
| 5,758,466 A * | 6/1998 | Tucker | E04B 1/615 | 52/127.1 |
| 5,791,103 A * | 8/1998 | Coolman | E06B 1/02 | 249/134 |
| 6,435,963 B1 * | 8/2002 | Dill | F24F 13/06 | 454/292 |
| 6,533,656 B2 * | 3/2003 | Hertel | F24F 13/1406 | 454/259 |
| 6,745,518 B2 * | 6/2004 | Weakes | E04B 9/006 | 454/299 |
| 6,835,129 B1 * | 12/2004 | Harris | F24F 13/082 | 454/289 |
| 6,866,579 B2 * | 3/2005 | Pilger | F24F 13/02 | 454/292 |
| 7,140,960 B2 * | 11/2006 | Pilger | F24F 13/06 | 454/292 |
| 7,645,189 B2 * | 1/2010 | Pilger | F24F 13/02 | 248/57 |
| 7,814,707 B1 * | 10/2010 | Hurst | E06B 5/01 | 49/464 |
| 8,096,088 B2 * | 1/2012 | Poirier | E06B 1/68 | 52/204.5 |
| 8,098,433 B2 * | 1/2012 | Rillie | F21S 11/007 | 359/591 |
| 8,127,504 B2 * | 3/2012 | McDaniel | E06B 7/23 | 49/504 |
| 8,261,498 B2 * | 9/2012 | Poirier | E06B 1/68 | 52/204.53 |
| 8,544,224 B1 * | 10/2013 | Hafendorfer | E04G 15/02 | 249/39 |
| 8,938,921 B2 * | 1/2015 | Hartman | E04C 2/525 | 454/199 |
| 9,052,059 B2 * | 6/2015 | Ileogben | F16M 11/24 | 248/346.06 |
| 9,194,728 B2 * | 11/2015 | Ileogben | G01F 1/00 | 454/333 |
| 2002/0096266 A1 * | 7/2002 | Tortorella, Jr. | F24F 13/084 | 160/93 |
| 2003/0019164 A1 * | 1/2003 | Weakes | E04B 9/006 | 52/22 |
| 2004/0077304 A1 * | 4/2004 | Pfannenberg | F24F 13/28 | 454/184 |
| 2004/0185772 A1 * | 9/2004 | Pilger | F24F 13/02 | 454/292 |
| 2005/0003754 A1 * | 1/2005 | Pilger | F24F 13/06 | 454/292 |
| 2005/0144861 A1 * | 7/2005 | Petta | E06B 3/4618 | 52/204.1 |
| 2006/0086052 A1 * | 4/2006 | Petta | B29C 47/0028 | 49/404 |
| 2007/0204535 A1 * | 9/2007 | Hughes | E06B 1/02 | 52/215 |
| 2008/0092463 A1 * | 4/2008 | Poirier | E06B 1/68 | 52/204.5 |
| 2008/0271394 A1 * | 11/2008 | Hand | E06B 1/02 | 52/210 |
| 2009/0193729 A1 * | 8/2009 | Kustermann | E04B 2/8652 | 52/215 |
| 2010/0325984 A1 * | 12/2010 | Richardson | E06B 1/02 | 52/215 |
| 2011/0083382 A1 * | 4/2011 | Sanders | E06B 1/342 | 52/215 |
| 2011/0154753 A1 * | 6/2011 | Furgerson | E06B 1/28 | 52/204.1 |
| 2011/0214370 A1 * | 9/2011 | Stewart | E06B 1/32 | 52/215 |
| 2011/0244781 A1 * | 10/2011 | Ileogben | G01F 1/00 | 454/333 |
| 2012/0267502 A1 * | 10/2012 | Ileogben | F16M 11/24 | 248/346.06 |
| 2013/0133276 A1 * | 5/2013 | Furgerson | E06B 1/28 | 52/204.1 |
| 2015/0118951 A1 * | 4/2015 | Beneke | F24F 13/20 | 454/330 |
| 2015/0135597 A1 * | 5/2015 | Gorman | F24F 13/12 | 49/456 |
| 2015/0300002 A1 * | 10/2015 | Feuer | F24F 13/0263 | 49/464 |
| 2016/0052768 A1 * | 2/2016 | Schmidt | B67C 11/02 | 141/337 |

* cited by examiner

FRAME SUPPORT FOR A HOOD VENT MEASUREMENT DEVICE

CROSS-REFERENCE TO RELATED APPLICATIONS

This application does not claim benefit of priority from any previously issued or currently pending applications.

TECHNICAL FIELD OF THE INVENTION

The invention relates to a frame for use in connection with apparatus for measuring air flow in building air ducts and in the balancing of air flow throughout internal building spaces.

BACKGROUND ART

To ensure adequate air flow and return to the interior spaces, especially in commercial buildings installed with HVAC systems, it is customary to employ certain techniques to measure the air flow being produced by the system. The procedures used to measure air flow for this purpose have been cumbersome and not amenable to easy manipulation of the measurement devices, which often do not properly fit over the vent opening to provide a tight enough seal to prevent leakage of the airflow, which can lead to inaccurate flow measurements. Vent grilles used in building construction are often of standard 2'×2' size, however they are sometimes modified to be non-standard for a variety of functional or esthetic reasons during construction and finishing of interior spaces. Sometimes they are crudely retrofitted with wedges, etc., to fit over vent openings that are not of the same size, and these additions create problems when measurement of air flow from the vent is to be measured. In addition, it is often difficult to manipulate the coverage of the grille opening because there is no means of securely fastening the measurement device, e.g. a hood skirt of a flowhood measurement device, to the grille opening. As a result, more than one operator is usually required to both hold the opening of the hood skirt over the vent opening and to record the series of air flow measurements required to diagnose the operating condition of the system and then to adjust the flow of air. Because of the need for more than one worker, the process is time-consuming and costlier because of the amount of manpower needed.

The prior art has not recognized a solution to the need for adapting the opening of an airflow measurement device such as a flowhood, to the standard and non-standard sized openings of ductwork vent grilles, which is easy to manipulate by a single operator and which provides an adequate sealing means to prevent diversion of air flow outside the receptacle of the measurement device, especially if the frame of the flowhood opening and the grille opening are not of compatible sizes. In addition, the devices used in air flow measurement have not been designed to provide a self-sustaining connection between the vent grille opening and the adaptably sized opening of an air flow measurement apparatus, such as the funnel or hood skirt of a flowhood. As a result, the funnel opening commonly has to be held in place by an operator. This adds to the cumbersome nature of the overall process. These deficiencies are satisfied by the design and functionality of the present invention.

In addition, the conventional flowhood frame made to fit hood skirts over vent grille openings is typically equipped with a gasket that is fixed or sealed in place and is not removable. Therefore, when the gasket becomes loose or damage, it cannot be replaced. Consequently, the entire apparatus must be discarded. The present invention address this deficiency in the prior art.

U.S. Pat. No. 6,435,963 discloses a barrier device for preventing staining of the ceiling around a ceiling air delivery structure caused by moisture and dirt deposited from the vent air flow. The barrier device is used with a diffuser and includes a partition and other facets designed to deflect the normal course of airflow from the vent. No means is provided for facilitating optimal measurement of air flow or for connection to an air flow measurement device. U.S. Pat. No. 6,835,129 discloses a boot seal used to temporarily close off air duct openings during construction. The boot seal is fitted directly over the ceiling opening and beneath the structure used to cover the opening. It covers the entire opening while installed so no air flow can be facilitated. U.S. Pat. No. 5,338,255 discloses a mounting shoulder for securing an air duct register to an air duct fitting that is passed through the plaster wall board of a wall or ceiling, particularly where there is no other backing means to which the register can be secured to hold it firmly in place. The mounting shoulder has an attachment strip that is spot welded to the lower edge of an air duct fitting, and a floor plate that is further attached along one edge of the attachment strip to stabilize the installation of the register as screws are manually installed or drilled through. U.S. Pat. No. 6,533,656 discloses a duct vent closure that covers a vent opening which has a hinged closure means that is forced open by increased air pressure and closed by decreased air pressure. This automatic duct vent closure regulates against backflow of treated air originally introduced into a room.

Based on the foregoing, it can be seen that the level of ordinary skill in the field of HVAC maintenance contends with methods of air flow measurement that present a technological as well as a manpower challenge. Not only is the equipment that has long been used and is still being used to facilitate air flow measurement within a building's circulation not amenable to easy attachment of a flowhood air measurement device to vent grille openings in the ductwork, the known process requires multiple personnel to cover the grille opening with a measurement receptacle such as a funnel, to hold the funnel in place, and to adjust it by making crude stencils of cardboard to fit the skirt opening to the size of the grille opening and the frame. There is therefore a need for an apparatus that allows easy and secure connection of a vent grille opening to the receptacle of an air flow measurement device, which is compatible with adjustment means that can be easily sized to fit precisely to the size of various vent grille openings, and which can be operated by a single operator.

The present invention solves these deficiencies and meets the need recognized within the field of the invention by providing an apparatus for securely attaching the opening of a flowhood measurement device to a vent grille opening, adjusting the size of the opening of the flowhood measurement device to match the size of the grille opening to reduce the leakage of air, and providing a seal around the grille opening, thus improving the ease of securing the flowhood measurement device to the grille opening, as well as improving the ease of taking accurate airflow measurements. The present invention further provides a solution to the costly and time-consuming process requiring multiple personnel to measure and adjust the airflow into a flowhood opening.

SUMMARY OF THE INVENTION

A flowhood is a device used to capture the air flow going in or coming out of a grille and channeled through an appurtenance with instrumentation to measure the airflow. The grille is a terminal through which air is discharged into a space from an air conditioning unit for the purpose of creating a desired ambient environment. A flowhood is generally composed of a frame, funnel, upright structure and base. The frame has a groove or slot on the side to which the funnel is attached. A gasket, for example a cellulose gasket is glued to the surface of the frame as means of ensuring the flowhood makes proper contact with the surface (seal) on which the grille is attached such that the airflow from the grille is completely captured and channeled for measurement. The funnel is generally made of non porous fabric is attached to the groove on the frame and the base. It channels the air through the opening on the frame opening to the base.

The upright structure according to the invention attaches the frame of the flowhood rigidly to the base. The base has a calibrated station and provides a means for attaching an instrument to the calibrated devices that measures the airflow through the hood. The base also includes a means for attaching the funnel and the flowhood frame structure. Co-pending and commonly owned U.S. patent application Ser. No. 12/753,794, Publication No. 20110244781A1, discloses flaps which may be securely attached or detached to create openings of various sizes configurable to the size of the vent grille opening and the size of a hood skirt opening. The flaps may be secured to the frame of the invention to change the diameter of the flowhood opening.

Grilles are generally mounted flush on the ceiling and walls. To measure air discharged from a grille, the flow hood is butted against the ceiling or wall at the frame, enclosing the grille thereby capturing and channeling the air to the base where the air is measured. However, there are situations in which the grilles are neither mounted flush on the ceiling or the wall or where the grille's size is not the same as the size of the frame of the flowhood. In these circumstances the flowhood cannot butt against the grille, wall or ceiling to capture the air from the grille. To measure the airflow in these circumstances, a stencil is cutout of a cardboard conforming to the opening of the flowhood and a window in the cardboard that conforms to the size of the grilles. The stencil is attached to the frame of the flowhood using pre-glued tapes or the like. This procedure is repeated for each grille that does not conform to standard installation. Cardboards, tapes and accessories used in creating the stencil are not part of the flowhood kit. So each time it is required to improvise airflow measurement these items have to be sourced. Consequently, when this occurs it creates discontinuity of the work, waste of time and loss of production. In additions, it takes a considerable time to swap cardboards stencils in situations with a variety of grille sizes. The invention disclosed in Publication No. 20110244781A1 provides an adjustable flap that solves this problem. Such a flap is fully compatible with the frame of the present invention.

Over time, the gasket on the conventional hood opening disintegrates. To replace the gasket is a monumental task. It requires scraping out the entire adhesive on the frame. Replacement gaskets do not adhere well and require frequent replacement. Furthermore, gaskets could become dirty and laden with contaminant that may not be healthy for continued used. An existing problem in the field of the invention is that because the gaskets are not easily replaceable, it has been more efficient, timewise, to discard the entire flowhood frame and replace it with a new frame which also has a glued or otherwise adhered gasket, and which will eventually result in discarding the replacement frame as well. The present invention provides a solution to the aforementioned problems by providing a flowhood frame that engages with a vent opening or grille of an air duct or hood for the attachment of a measurement device such as a funnel or hood skirt.

This invention is a flowhood frame. The frame comprises corner braces for reinforced rigidity, two grooves on the side and a slot on the top. The lower groove on the side of the frame provides a means for attaching the funnel to the flow hood. The upper groove on the side of the frame provides a means for attaching a stencil with variable opening to the frame of the flowhood. The slot on the top of the frame provides a means of attaching a gasket to frame without glue and so enables easy gasket replacement.

The invention comprises a frame for surrounding the external perimeter of a vent opening comprising a removable sealing gasket and two pairs of frame elements comprising the four sides of the frame, wherein each pair of frame elements is connected approximately perpendicularly at corresponding ends thereof by a connector and a corner brace; and further wherein each frame element comprises an outer ridge element, a center ridge element and an inner ridge element. Each of the outer ridge element, the center ridge element and the inner ridge element is formed of a ridged element that is perpendicularly connected to a base planar element, and each of the outer ridge element, the center ridge element and the inner ridge element are spatially and separately connected to the base element in parallel configuration and are co-axial with the vertical length of the frame element. The end of the outer frame element that is adjacent the base element is integrally formed with a locking tab, and the end of the inner ridge element that is opposite the base element is perpendicularly connected to a slot element, which is integrally and terminally formed with a slot holder perpendicularly positioned in relation to said slot element, and further wherein the end of the base element that is nearest to the inner frame element is perpendicularly and integrally connected to an integral holder tab, thereby forming a gasket slot for receiving the removable sealing gasket. The frame also includes a stabilizing element which is connected on one side thereof to the outer, center and inner ridge elements, and is also integrally connected with the end of outer ridge element to form a locking slot.

The frame of the invention provides a secure seal around the vent opening when interposedly engaged between the opening of the hood skirt and the vent opening. In this respect, the frame provides a sealed joint between the hood skirt and the vent opening that eliminates air loss because of the lack of a tight seam. The invention also provides a means of sealing the connection between the frame and an opening to which it is attached that can be detached and replaced as needed. This means is providing through the attachment of a sealing gasket, which unlike frames in the prior art is removable and therefore allows for replacement of the gasket after it loses it elasticity or sealing ability. There is also provided a method of measuring airflow from a vent grille opening, which includes interposing between the grille and the opening of an air flow measurement apparatus a frame according to the invention.

BRIEF DESCRIPTION OF THE DRAWINGS

shows a transverse section of a frame element comprising a side of the frame which is engaged with a removable sealing gasket according to one embodiment of the invention.

DESCRIPTION OF VARIOUS EMBODIMENTS OF THE INVENTION

According to the various embodiments of the invention, the foregoing objectives and advantages of the present invention are met by the particular arrangement of features in the form of a frame for the opening of a flow hood assembly that is capable of being installed over a vent grille opening. The frame of the invention cooperates with the funnel of the flowhood assembly and with the adjustment flaps of that assembly to secure the funnel over the grille.

Figure 1:
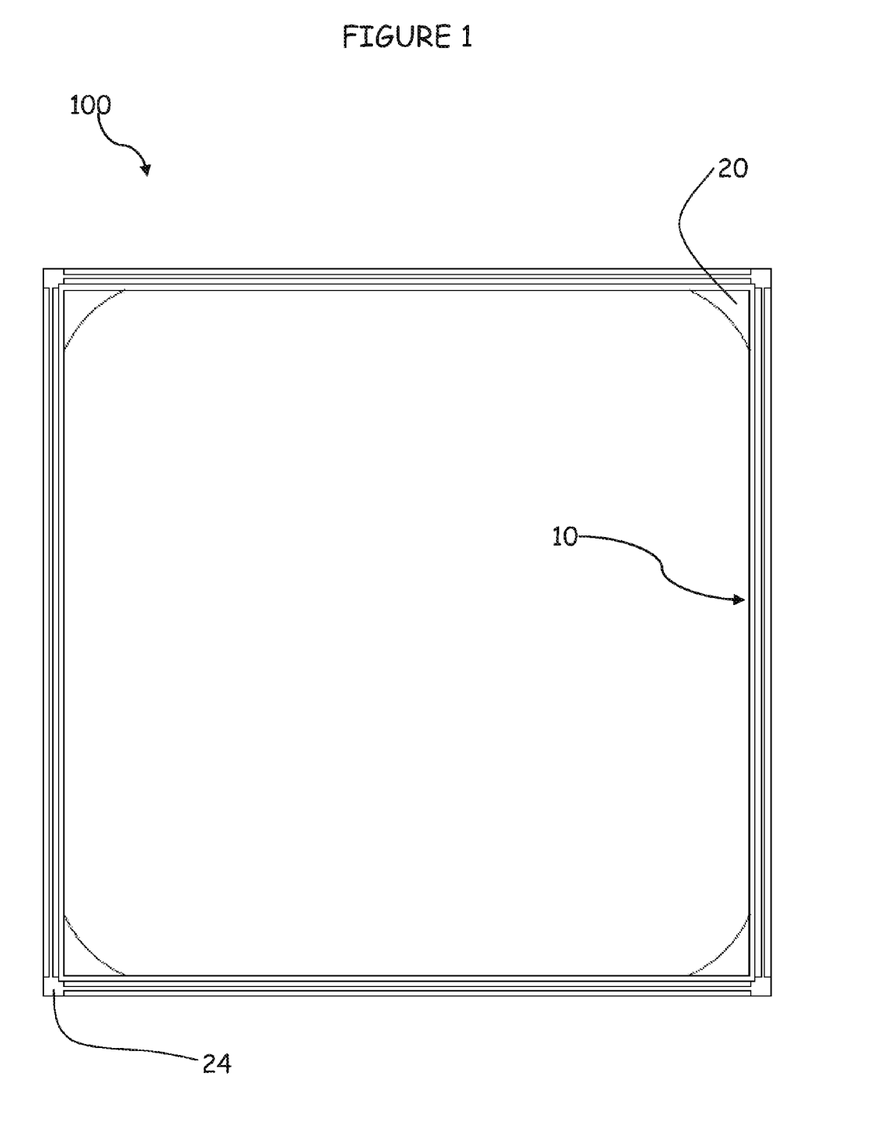
FIG. 1 represents a planar view of the invention showing the frame elements, connectors and corner braces.
Figures 2A, 2B:
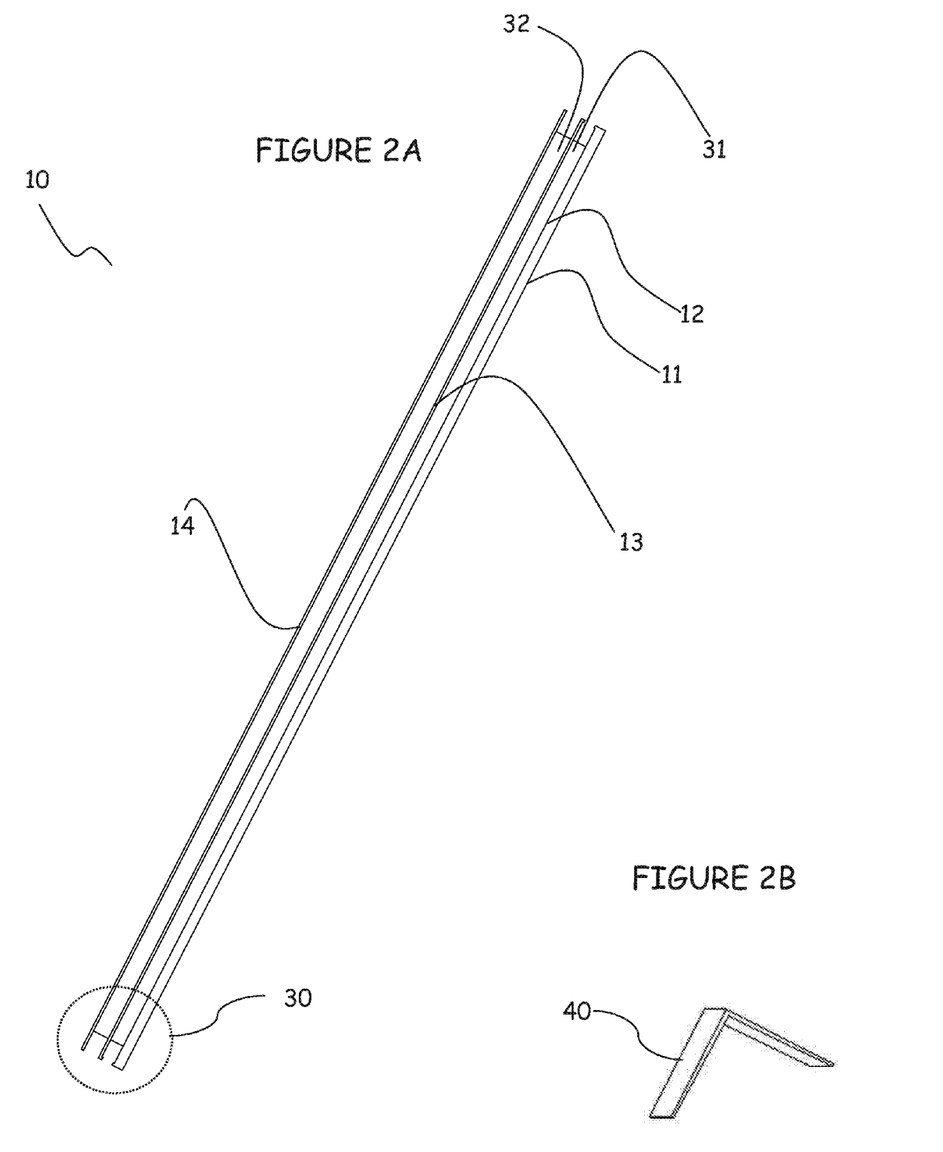
FIG. 2A is a lateral view of a frame according to the invention, which shows the outer, center and inner frame elements, grooves between the inner and outer frame elements and an inner sealing gasket.
FIG. 2B represents an L-shaped bracket element according to one embodiment of the invention.
Figure 3:
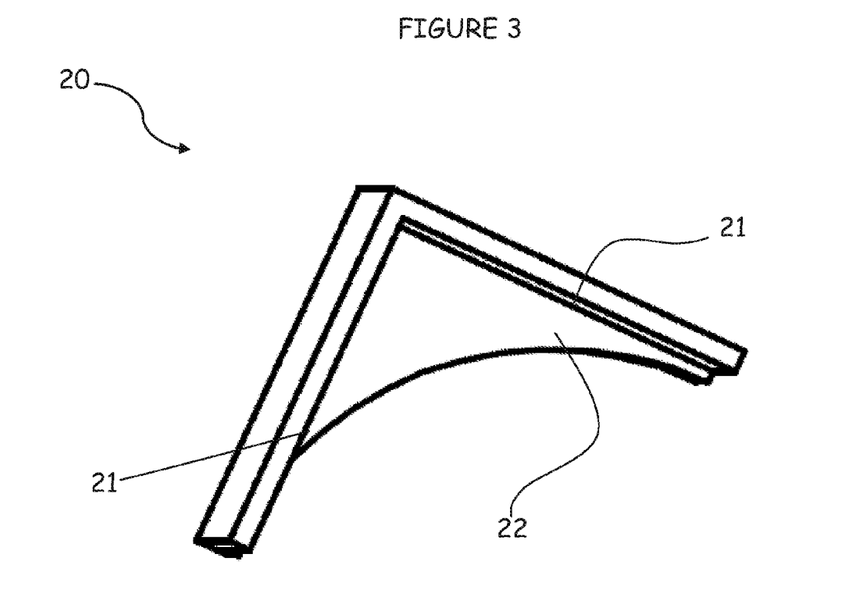
FIG. 3 presents a three-dimensional view of a corner brace of the frame.

Turning now to the figures, FIG. 1 shows vent frame 100 comprised of frame elements 10 that form the four sides of the frame. Inserted into each corner and held together by the corresponding pair of frame elements 10 is a corner brace 20. The corners of the frame are, in optional embodiments, further held together by connectors 24. FIG. 2B shows an L-shaped bracket that may also optionally connect the corners of the frame elements as an additional connecting means. The corner brace, as shown in FIG. 3, comprises an arced or other-shaped planar piece which extends between and is joined directly to the frame elements or to the L-shaped brackets, usually by welding, on the engaging sides 21 thereof. It should be noted that the frame elements generally may be connected at the corners of the frame by removable means or permanent means such as welding.

As shown in FIG. 2A, the frame element 10 is comprised of an outer ridge element 14, a center ridge element 13, an inner ridge element 12, and grooves 23. The outer, center and inner ridge elements are constructed of a rigid, durable material such as aluminum, zinc or steel. A preferred material is aluminum. According to FIG. 4, each ridge element is perpendicularly connected to a base element 15. Each of the outer ridge element, the center ridge element and the inner ridge element are spatially and separately connected to the base element 15 in parallel configuration and are co-axial with the vertical length of the frame element 10. The outer ridged element 14 and the base element 15 together define edge slot 39 to which connectors such as clips may also be affixed to attach the frame to a variety of apparatus or ceiling configurations for receiving the edges of the adjustment flaps and the funnel. As further shown in FIG. 4, the end of the outer ridge element 14 that is most closely adjacent to the base element 15 is integrally formed as a locking tab 38 beneath which the edge of a hood skirt may be inserted and held in place. The locking tab 38, the base element 15 and the locking tab 38 together define a locking slot 39, which may receive the edge of the funnel.

Figure 4:
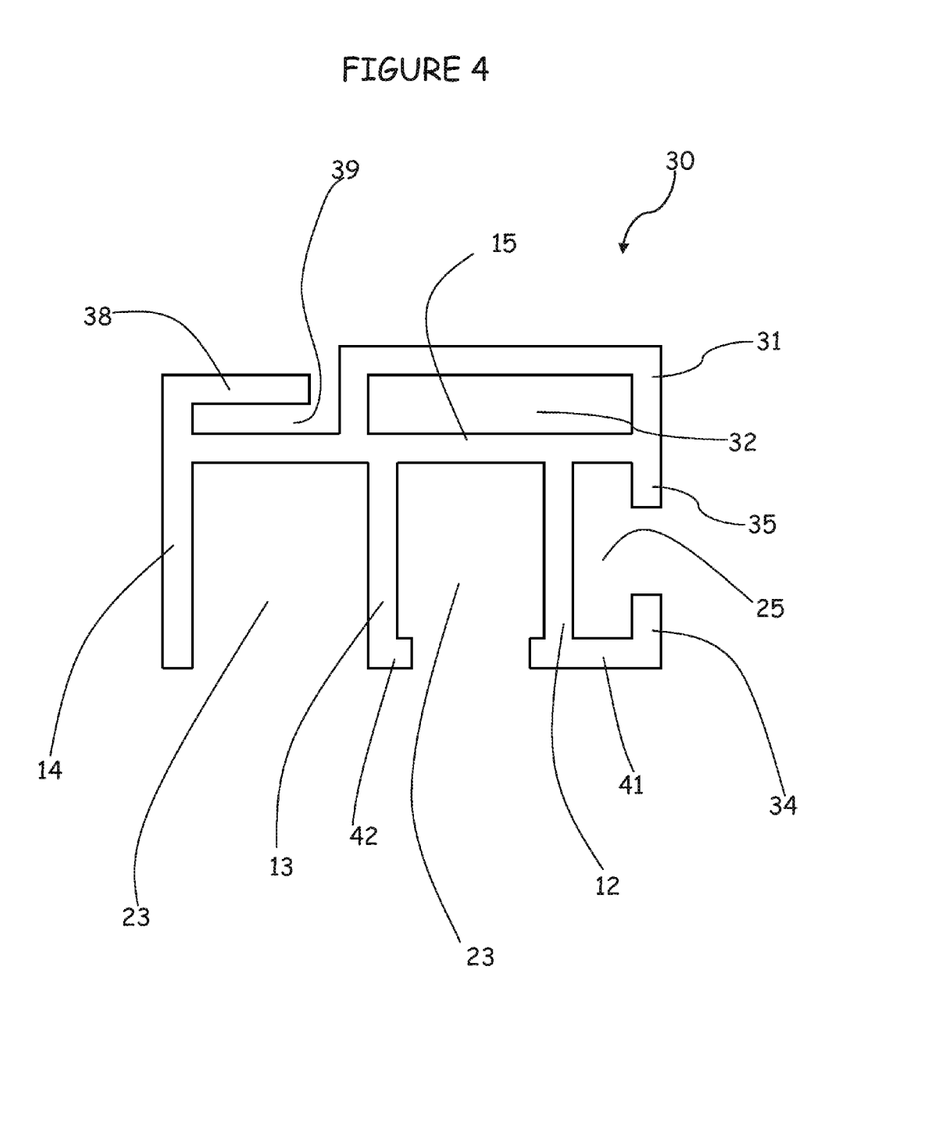
FIG. 4 depicts a planar, transverse view of a frame element showing the positions for engagement of the frame with the vent hood, removable sealing gasket and other apparatus.

The end of the inner ridge element that is opposite the base element 15 is angularly connected to a slot element 41, which is integrally and terminally formed with a slot holder 34 that is perpendicularly positioned in relation to said slot element 41. Additionally, the end of the base element that is nearest to the inner ridge element 12 is angularly and integrally connected to a holder tab 35 to form a gasket slot 25 for receiving the removable sealing gasket 11. The base element, on one side, is further joined to a U-shaped element 31 which provides added stabilization to the exterior of the frame, as well as a handle for gripping and manipulation of the frame by an operator. By the slot 32 created by attachment of the element 31, excess weight is removed from the frame while providing the desired strength, durability, stability and resistance to bending or warping.

As further shown in transverse section in FIG. 4, the ridge elements 12, 13 and 14 define grooves 23 for engaging the frame element 10 with aspects of the vent grille or other apparatus; and gasket slot 25, which is defined in part by the inner ridge element 12 and by gasket holder tabs 34, 35. The frame element 10 further includes an inverted U-shaped stabilizing element 31 which is integrally affixed atop the base element 15 which connects ridge elements 12, 13 and 14, to form a hollow slot or channel 32. The outer ridge element is co-terminal with and angularly disposed in relation to a locking tab 38.

Figure 5:
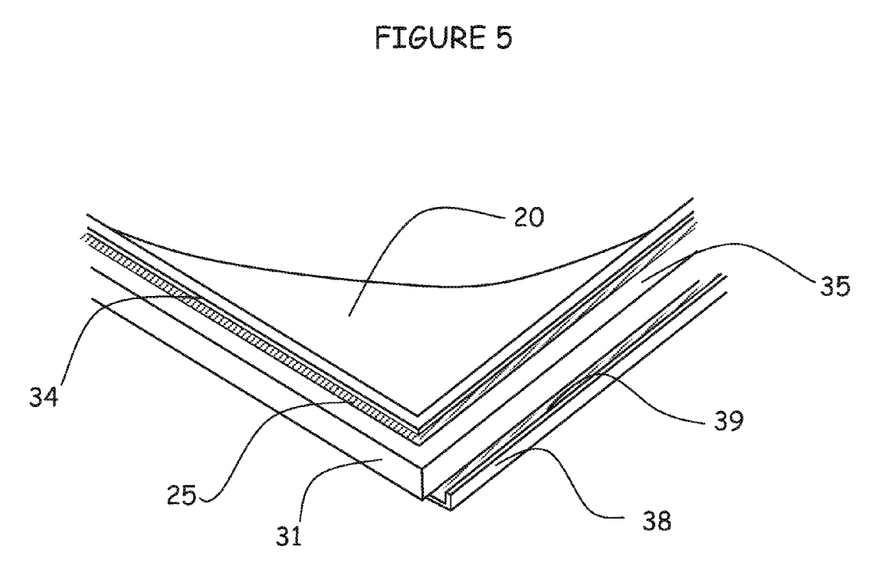
FIG. 5 provides a three-dimensional view of a corner of the frame according to an embodiment of the invention.

FIG. 5 shows the frame of the invention having corner braces 20 disposed between the pairs of frame elements 10 at the corners to provide additional stabilizing support. In this manner, the frame of the invention provides increased durability and strength when engaged with the vent opening, and is sturdier and more able to support the tension created by engagement with the hood skirt. The web piece is sub-planar to the gasket slot 25 and the gasket holder tabs 34 and 35, but is in a planar elevation above the locking slot 39.

Figure 6:
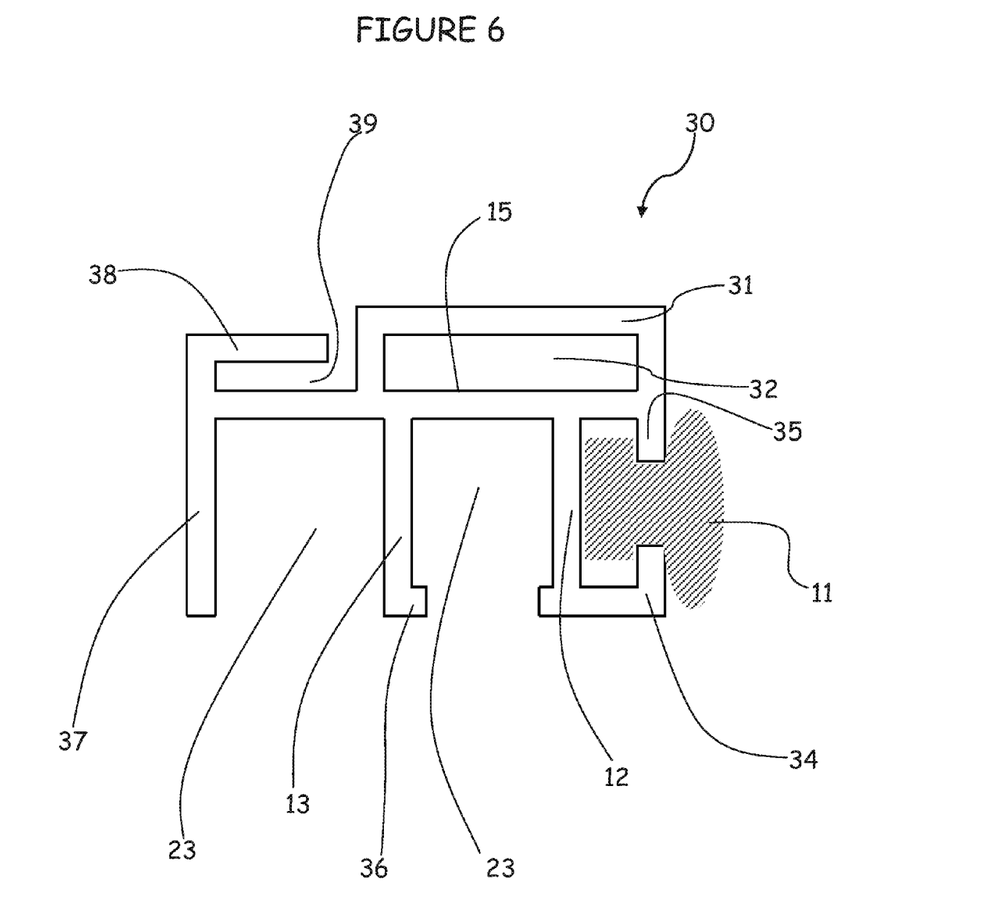
FIG. 6 provides a transverse view of a frame element showing placement of a sealing gasket.
Figure 7:
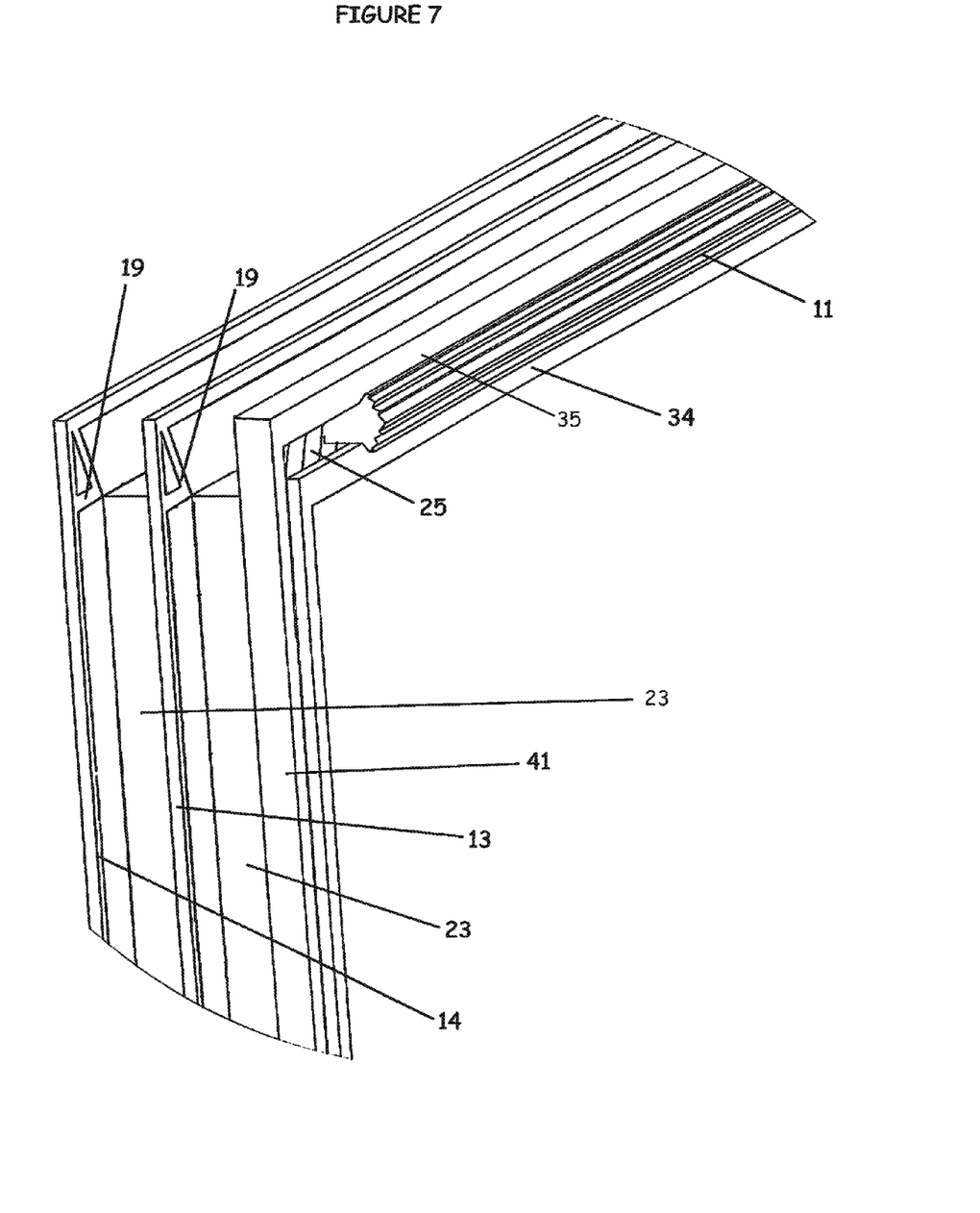
FIG. 7 is a three-dimensional view of the stabilized construction of the frame according to one embodiment of the invention.
Figure 8:
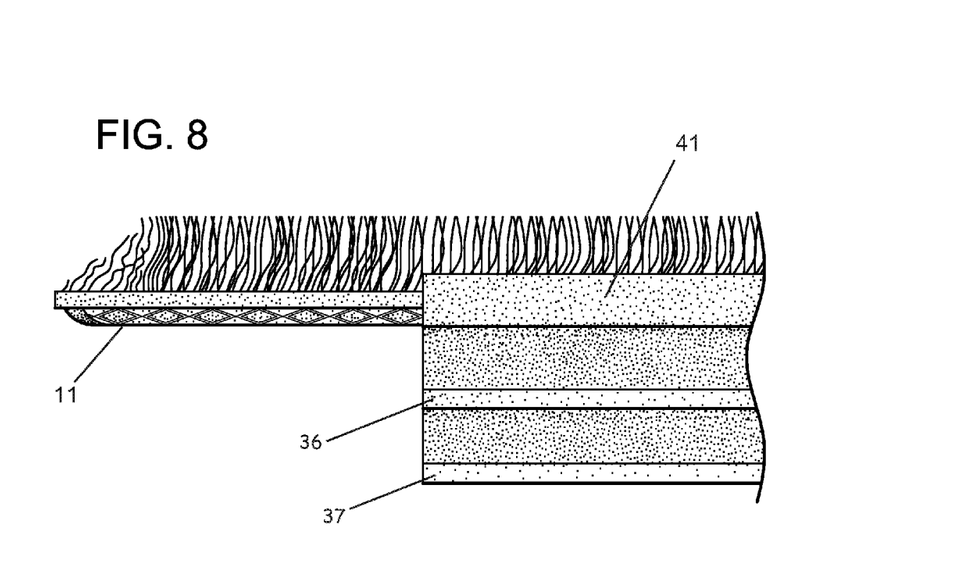
FIG. 8 is a photographic image of a section of a frame element having the removable sealing gasket inserted in a gasket slot.
Figure 9:
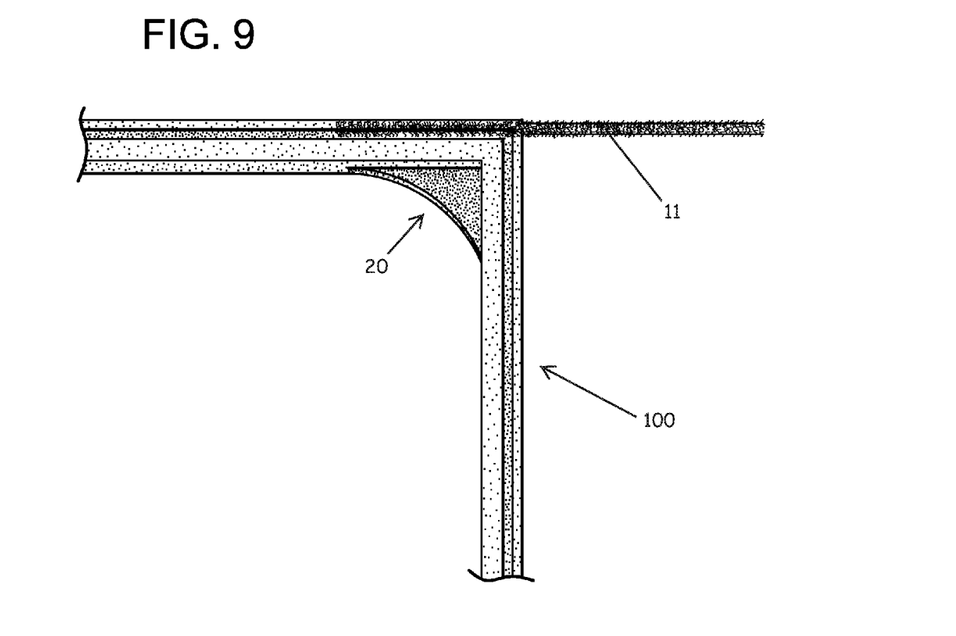
FIG. 9 is a photographic image of a frame having a portion of a removable sealing gasket partially inserted therein.
Figure 10:
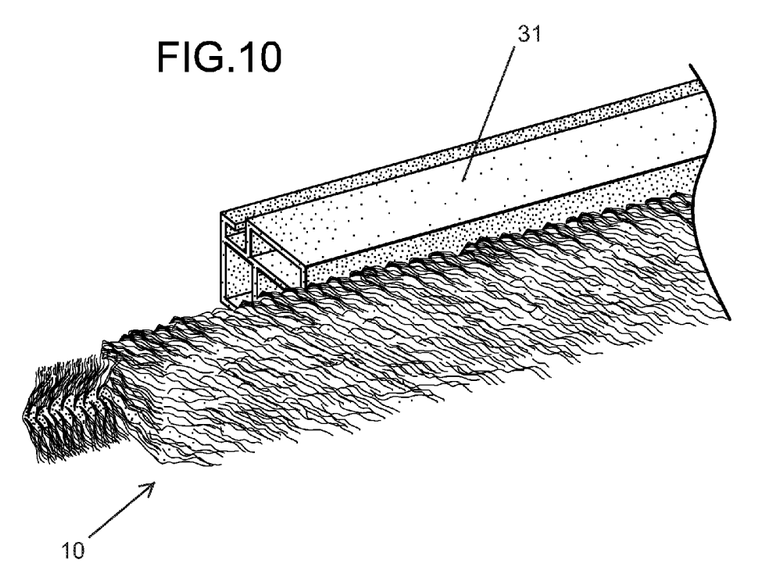
FIG. 10 is a photographic image of a three-dimensional view of the frame element showing the removable sealing gasket installed in the frame element and the slot for receiving the edges of the opening of a vent measurement device, such as a hood skirt.
Figure 11:
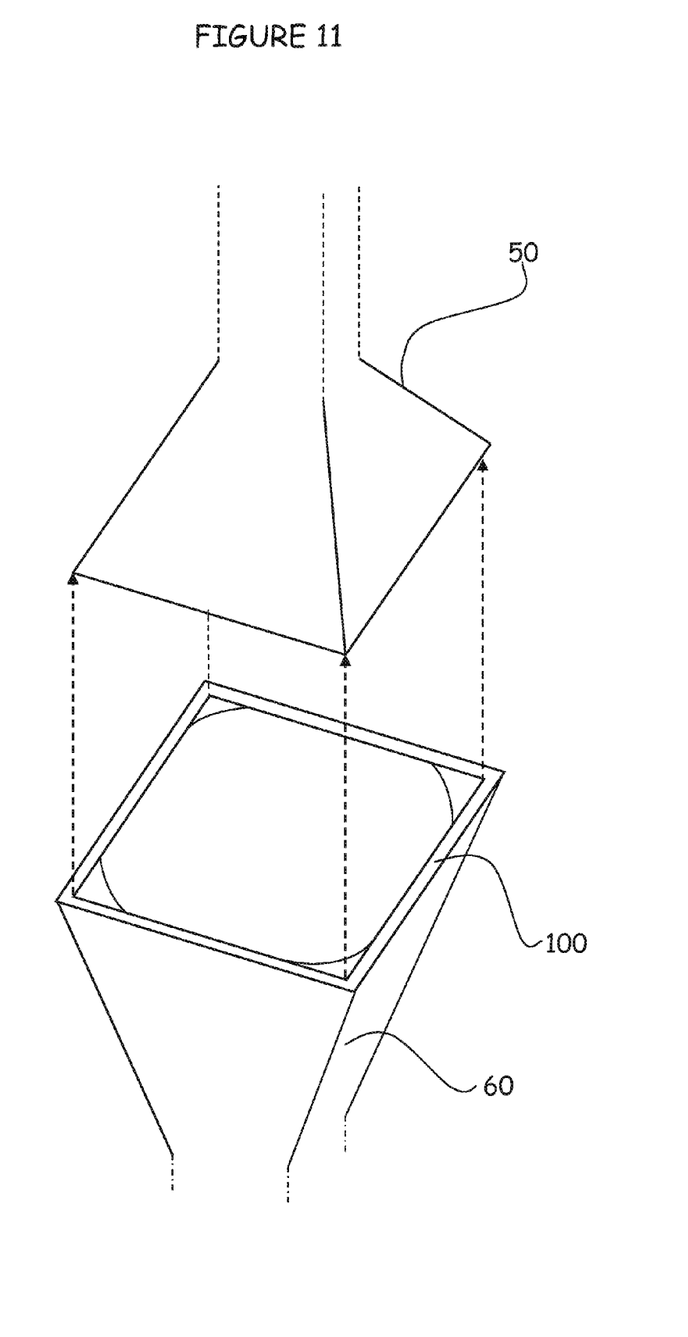
FIG. 11 provides an exploded view of the hood frame in relationship to a funnel opening and to the corresponding opening of the funnel of an airflow measurement apparatus.

FIG. 6 shows an embodiment of the connector 24 which is composed of structural elements 19 that are molded, welded or fused into the frame corners to provide joinder, stabilization and closure. As shown in the figure, these structural elements 19 may be used to join the ridge elements 13 and 14. FIG. 7 shows a transverse view of the frame showing engagement of the removable sealing gasket 11 with the slot 25, wherein the gasket 11 is held in place by the holder tabs 34, 35, but is capable of being removed and detached by pulling to disengage it from the slot 25. As shown in FIG. 7, the removable sealing gasket 11 is inserted into and protrudes in elevation above the plane of the frame element 10 to engage and provide a seal around the perimeter of the vent opening to which the frame 100 is affixed. FIGS. 8, 9 and 10 show the insertion of the removable sealing gasket into the gasket slot which provides a channel for aligning the gasket along the edge of the frame. The gasket may be removed by withdrawing it from the slot and a replacement inserted to maintain the optimal sealing function of the frame, which is otherwise very minimally susceptible to wear and tear, if at all. FIG. 11 shows a view of the frame 100 positioned in relation to the grille opening of a vent 50. In operation, the frame is fit over the vent opening so as to position the side of the frame exposing the removable sealing gasket 11 for direct contact with the flexible opening of a flowhood funnel 60.

The foregoing description of specific embodiments is not intended to be limiting on the scope of this disclosure, but rather to be illustrative of the broad concepts embodied by this invention. Those skilled in the art will appreciate that the present invention contemplates the various embodiments of the invention herein described as well as equivalents thereof. However, those skilled in the art will also appreciate that the scope of this invention should be measured by the attached claims as well as by the specific embodiments identified.

The invention claimed is:

1. A frame for connecting an opening of an airflow measurement apparatus to an external perimeter of an air vent opening, comprising:
    (a) a removable sealing gasket; and
    (b) two pairs of frame elements comprising four sides of the frame, wherein each pair of frame elements is connected approximately perpendicularly at corresponding ends thereof; and further wherein each frame element comprises an outer ridge element, a center ridge element and an inner ridge element, wherein:
        (i) each of the outer ridge element, the center ridge element and the inner ridge element is perpendicularly connected to a planar base element,
        (ii) each of the outer ridge element, the center ridge element and the inner ridge element is spatially and separately connected to the base element in parallel configuration and are co-axial with a vertical length of the frame element,
        (iii) an end of the outer ridge element that is adjacent the base element is integrally formed with a locking tab, and
        (iv) an end of the inner ridge element that is opposite the base element is perpendicularly connected to a slot element, which is integrally and terminally formed with a first holder tab perpendicularly positioned in relation to said slot element, and
    further wherein an end of the base element that is nearest to the inner ridge element is perpendicularly and integrally connected to an integral second holder tab, thereby forming a gasket slot for receiving the removable sealing gasket; and further wherein a side of the base element opposite the outer, center and inner ridge elements is connected to a stabilizing element, and is integrally connected with the end of a respective said outer ridge element to form the locking tab.

2. The frame of claim 1 wherein the frame elements are cast as a single, integrally formed piece.

3. The frame of claim 1 wherein the locking tab and the base element define a locking slot.

4. The frame of claim 1 which is constructed from aluminum.

5. The frame according to claim 1, further including one or more first grooves on a frame perimeter for attachment of the frame to edges of the opening of the airflow measurement apparatus.

6. The frame according to claim 5, additionally comprising one or more second grooves on the frame perimeter for attachment of the frame to edges of an adjustment flap used to temporarily adjust a size of the air vent opening.

7. The frame according to claim 6, wherein the adjustment flap is positioned over or attached to an air vent grille.

8. A system for measuring air flow from a vent grille opening comprising contacting the vent grille opening and an opening of an air measurement device with a frame comprising:
    a. two pairs of frame elements comprising four sides of the frame, wherein each pair of frame elements is connected approximately perpendicularly at corresponding ends;
    b. one or more connectors for connecting the ends of each said pair of frame elements at right angles;
    c. a corner brace for stabilizing the perpendicular connection between each said pair of frame elements; and
    d. a removable sealing gasket;
    wherein
        (i) each frame element comprises an outer ridge element, a center ridge element and an inner ridge element, wherein each ridge element is angularly connected to a planar base element spatially and is co-axial with a vertical length of the frame element;
        (ii) an end of the outer frame element that is adjacent the base element is integrally formed with a locking tab, and
        (iii) an end of the inner ridge element that is opposite the base element is perpendicularly connected to a slot element, which is integrally and terminally formed with a slot holder perpendicularly positioned in relation to said slot element, and further wherein an end of the base element that is nearest to the inner ridge element is perpendicularly and integrally connected to an integral holder tab, thereby forming a gasket slot for receiving the removable sealing gasket; and
    further wherein a side of the base planar element opposite the outer, center and inner ridge elements is connected to a stabilizing element, and is integrally connected with the locking tab to form a locking slot; and
    further wherein the locking slot is securely engaged with the opening of the air measurement device during measurement.

9. The system of claim 8 wherein the opening of the air measurement device is comprised of edges of a funnel.

10. The system of claim 9 wherein the frame engages with edges of one or more adjustment flaps disposed in relation to the vent grille opening to adapt a size of said vent grille opening to a size of the funnel.

* * * * *